(12) United States Patent  
Wu

(10) Patent No.: US 12,142,004 B2  
(45) Date of Patent: Nov. 12, 2024

(54) IMAGE DISPLAY METHOD AND APPARATUS, AND ELECTRONIC DEVICE

(71) Applicant: Qingdao Pico Technology Co., Ltd., Shandong (CN)

(72) Inventor: Tao Wu, Beijing (CN)

(73) Assignee: QINGDAO PICO TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 18/400,575

(22) Filed: Dec. 29, 2023

(65) Prior Publication Data

US 2024/0135580 A1 Apr. 25, 2024
US 2024/0233174 A9 Jul. 11, 2024

Related U.S. Application Data

(63) Continuation of application No. PCT/CN2022/078362, filed on Feb. 28, 2022.

(30) Foreign Application Priority Data

Sep. 23, 2021 (CN) .......................... 202111116873.5

(51) Int. Cl.
*G09G 5/00* (2006.01)
*G06T 7/00* (2017.01)
(Continued)

(52) U.S. Cl.
CPC .................. *G06T 7/74* (2017.01); *G06T 7/97* (2017.01); *G06T 11/00* (2013.01); *G06T 2207/10012* (2013.01); *G06T 2207/20221* (2013.01)

(58) Field of Classification Search
CPC ......... G06T 19/006; G06T 19/00; G06T 7/74; G06T 7/94; G06T 11/00;
(Continued)

(56) References Cited

U.S. PATENT DOCUMENTS

2010/0208033 A1* 8/2010 Edge .................... G06T 19/006
348/46
2015/0356788 A1* 12/2015 Abe ...................... A63F 13/335
345/633
(Continued)

FOREIGN PATENT DOCUMENTS

CN 112365605 A 2/2021
CN 112419509 A 2/2021
(Continued)

OTHER PUBLICATIONS

International Search Report in PCT/CN2022/078362, mailed Jun. 1, 2022, 3 pages.
(Continued)

*Primary Examiner* — Gordon G Liu
(74) *Attorney, Agent, or Firm* — Astute IP Law Group

(57) ABSTRACT

Embodiments of the present disclosure provide an image display method and apparatus, and an electronic device. The method includes: obtaining target position information of a user in a real environment when the user is in a virtual environment; obtaining first image data corresponding to the real environment and second image data corresponding to the virtual environment when the target position information meets a predetermined condition, both the first image data and the second image data being based on a same coordinate space; performing superposition and merging processing on the first image data and the second image data to generate third image data; and displaying the third image data, to enable the user to view environment data in the real environment when the user is in the virtual environment.

14 Claims, 1 Drawing Sheet

(51) Int. Cl.
*G06T 7/73* (2017.01)
*G06T 11/00* (2006.01)

(58) Field of Classification Search
CPC . G06T 2207/10012; G06T 2207/20021; G06F 3/011; G06F 3/012; G02B 27/017; G02B 1/041; G02B 2027/0178
USPC ......................................................... 345/633
See application file for complete search history.

(56) References Cited

U.S. PATENT DOCUMENTS

2018/0232056 A1* 8/2018 Nigam .................... G06F 3/167
2020/0058165 A1 2/2020 Choi et al.

FOREIGN PATENT DOCUMENTS

| CN | 112630964 A | 4/2021 |
| CN | 113935931 A | 1/2022 |
| WO | 2020/051490 A1 | 3/2020 |

OTHER PUBLICATIONS

Extended European Search Report for European Application No. 22871320.2, mailed Aug. 23, 2024, 7 pages.

* cited by examiner

IMAGE DISPLAY METHOD AND APPARATUS, AND ELECTRONIC DEVICE

PRIORITY INFORMATION

The present application is a continuation of International Application No. PCT/CN2022/078362 filed on Feb. 28, 2022, which claims priority to Chinese Patent Application No. 202111116873.5, entitled "IMAGE DISPLAY METHOD AND APPARATUS, AND ELECTRONIC DEVICE" filed on Sep. 23, 2021, the entire content of which is incorporated herein by reference.

TECHNICAL FIELD

The embodiments of the present disclosure relate to the technical field of mixed reality, and in particular to an image display method and apparatus, and an electronic device.

BACKGROUND

With the continuous development of virtual reality (VR) technology, the current VR head device can generally support 6 degrees of freedom (6 DoF) scene usage. That is, when wearing a VR device, the user can freely walk around and back and forth to experience various contents in the virtual environment.

In the process of a user wearing a VR device to experience the virtual environment, since the user can freely walk at will, a collision with an obstacle in a real environment may occur, for example, a collision with various objects in a real environment, such as a wall, a desktop, a sofa, etc. which may bring some hazards to the user's safety. At present, in order to protect the safety of a user, before the user wears a VR device, one fixed security area virtual fence is generally preset; and when the user moves freely in a virtual environment, if the user is close to the security area virtual fence, the security area virtual fence is displayed in the virtual environment so as to remind the user to pay attention.

Although the current method can guarantee the user's safety to a certain extent, the user has a large range of actions in the process of wearing the VR device to experience a virtual environment. In this case, the above-mentioned way may have the problem of being unable to remind the user.

SUMMARY

An object of the present disclosure is to provide a new technical solution of an image display method and apparatus, and an electronic device, so as to solve the problem of the existing method that a user cannot be reminded in time when the user is in a virtual environment and there is a security risk.

According to the first aspect of the present disclosure, provided is an embodiment of an image display method. The method includes: obtaining target position information of a user in a real environment when the user is in a virtual environment; obtaining first image data corresponding to the real environment and second image data corresponding to the virtual environment when the target position information meets a predetermined condition, both the first image data and the second image data being based on the same coordinate space; performing superposition and merging processing on the first image data and the second image data to generate the third image data; and displaying the third image data, to enable the user to view environment data in the real environment when the user is in the virtual environment.

Optionally, said obtaining the first image data corresponding to the real environment and the second image data corresponding to the virtual environment when the target position information meets the predetermined condition includes: obtaining the first image data and the second image data when the first distance between a position represented by the target position information and a predetermined boundary is smaller than a first predetermined threshold.

Optionally, said obtaining the first image data corresponding to the real environment and the second image data corresponding to the virtual environment when the target position information meets the predetermined condition includes: obtaining the first image data and the second image data when a second distance between a position represented by the target position information and a target object in the real environment is smaller than a second predetermined threshold, the target object being predetermined by the user.

Optionally, the method is applied in a virtual reality device, and the virtual reality device comprises an image collecting apparatus. Said obtaining the first image data corresponding to the real environment includes: obtaining fourth image data for the real environment collected by the image collecting apparatus; and converting an object contained in the fourth image data into the coordinate space corresponding to the second image data to obtain the first image data.

Optionally, said performing superposition and merging processing on the first image data and the second image data to generate the third image data includes: rendering all objects contained in the first image data to corresponding positions in the second image data to obtain the third image data.

Optionally, said rendering all objects contained in the first image data to the corresponding positions in the second image data to obtain the third image data includes: obtaining a first object category and first position information of a first object in the first image data, the first object being any object in the first image data; obtaining a second object category of a second object at a position represented by the first position information in the second image data; determining a relative positional relationship between the first object and the second object based on the first object category and the second object category; and rendering the first object to the second image data based on the relative positional relationship to obtain the third image data.

Optionally, the method further includes, subsequent to said displaying the third image data: obtaining third-position information of the user; and stopping generating and displaying the third image data when the third position information does not meet the predetermined condition.

Optionally, the method is applied in at least one of: a virtual reality device, an augmented reality device, or a mixed reality device.

According to the second aspect of the present disclosure, provided is an embodiment of an image display apparatus. The apparatus includes: a target position information obtaining module, an image data obtaining module, a data merging module, and a display module. The target position information obtaining module is configured to obtain target position information of a user in a real environment when the user is in a virtual environment. The image data obtaining module is configured to obtain first image data corresponding to the real environment in real time and second image data corresponding to the virtual environment in real-time when the target position information meets a predetermined condition, both the first image data and the second image data being based on a same coordinate space. The data merging module is configured to perform superposition and merging processing on the first image data and the second image data to generate the third image data. The display module is configured to display the third image data, to enable the user to view environment data in the real environment when the user is experiencing the virtual environment based on the third image data.

According to the third aspect of the present disclosure, provided is an embodiment of an electronic device, such as the apparatus in the second aspect of the present description.

Alternatively, the electronic device includes: a memory having executable instructions stored thereon; and a processor configured to, under control of the instructions, cause the electronic device to perform the method according to the first aspect of the present description.

An advantageous effect of the embodiments of the present disclosure is that according to the embodiments of the present disclosure, target position information of the user in a real environment is obtained when a user is in a virtual environment, and the first image data corresponding to the real environment and the second image data corresponding to the virtual environment are obtained when the target position information meets a predetermined condition, and the third image data generated after performing superposition and merging processing on the first image data and the second image data is displayed to the user, the user can understand and determine the obstacle in the real environment and the distance to the obstacle in the real environment based on the third image data without departing from the virtual environment, so as to pre-warn the user in advance, thereby avoiding the problem that the reminding is not timely.

Other features and advantages of the present description will become apparent from the following detailed description of exemplary embodiments of this description with reference to the accompanying drawings.

BRIEF DESCRIPTION OF DRAWINGS

The accompanying drawings, which are incorporated into and form a part of the description, illustrate embodiments of this description and are used together with their explanations to explain the principles of this description.

DESCRIPTION OF EMBODIMENTS

Various exemplary embodiments of the present disclosure will now be described in detail with reference to the accompanying drawings. It should be noted that the relative arrangement of the components and steps, the numerical expressions, and the values set forth in these embodiments should not be construed as limitation on the present disclosure, unless otherwise specified.

The description of at least one exemplary embodiment below is actually only illustrative and does not serve as any limitation on the present disclosure, and the application or use thereof.

Techniques, methods, and devices known to those of ordinary skill in the related art may not be discussed in detail, but the techniques, methods, and devices should be considered as part of the description where appropriate.

In all examples shown and discussed herein, any particular value should be interpreted as illustrative only and not as limiting. Therefore, other examples of exemplary embodiments may have different values.

It should be noted that: like numbers and letters refer to like items in the following figures, and thus, once a certain item is defined in one figure, further discussion thereof is omitted in subsequent figures.

Method Embodiments

Figure 1:
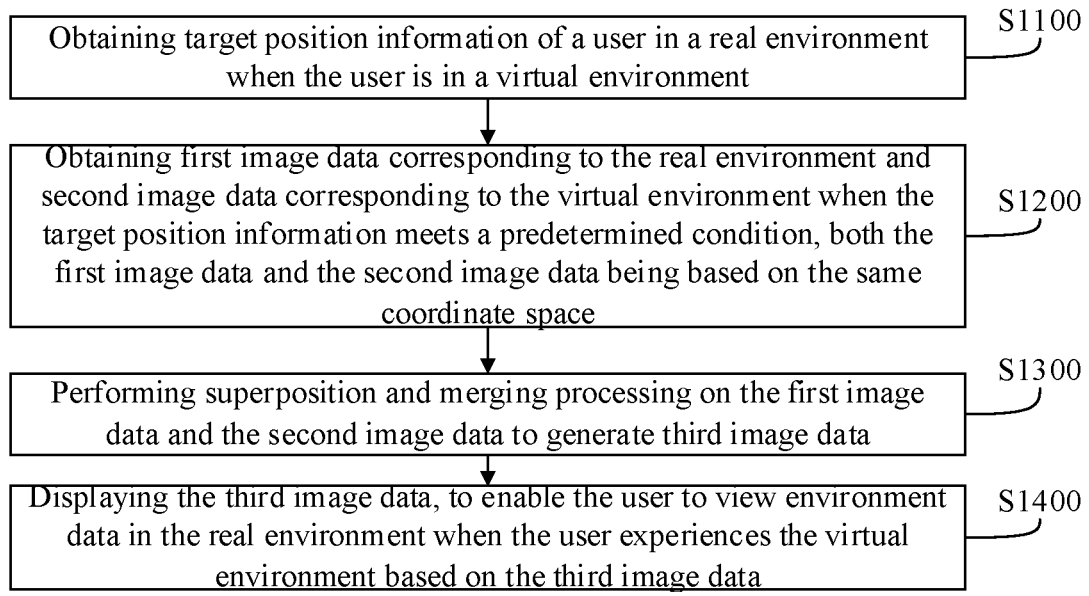
FIG. 1 is a schematic flowchart of an image display method according to an embodiment of the present disclosure.

FIG. 1 shows a schematic flowchart of an image display method according to an embodiment of the present disclosure. The method may be applied in electronic devices such as a virtual reality device, an augmented reality device, and a mixed reality device.

In this embodiment, the electronic device implementing the method is exemplified as a virtual reality device, for example, a VR head-mounted all-in-one device. The virtual reality device includes a display apparatus and at least two image collecting apparatuses. At least two image collecting apparatuses can be fixedly mounted on the virtual display device in a position simulating the human eyes of a user. The virtual reality device can, via the stereoscopic vision imaging principle and computer vision technology, perform left-right stereoscopic alignment on the original image data collected by the at least two image collecting apparatuses and simultaneously real-time merge 6 DoF tracking information to enable the user to view the information in the real environment via the virtual reality device as desired. In a specific implementation, the specifications of at least two image collecting apparatuses may be specifically for collecting black and white or color images, with a frame rate above 30 Hz, an Field Of View (FOV) not smaller than 120 degrees, and an exposure mode of Global shutter.

As shown in FIG. 1, the method of the present embodiment may include steps S1100 to S1400, which will be described in detail below.

Step S1100, target position information of a user in a real environment is obtained when the user is in a virtual environment.

Specifically, in the present embodiment, in order to ensure user security, during the process that a user wears an electronic device, for example, a VR head-mounted all-in-one device, to experience a virtual environment, real environment data of a real environment where the user is located, for example, a home environment, an office environment, or an outdoor environment, can be collected by an image collecting apparatus on the device, to obtain the target position information of the user. Therefore, whether it is necessary to display various physical objects in the real environment where the user is located, in a superposition and merging manner, in the virtual environment where the user is currently located is determined based on the target position information. The user can know and determine the distance from various objects in the real environment in advance without departing from the virtual environment, so as to avoid collision with various objects in the real environment.

The target position information is information representing a position where the user is located in the real environment.

In a specific implementation, the target position information may be two-dimensional coordinate data in the image data collected by the image collecting apparatus, or may be three-dimensional stereoscopic coordinate data obtained after converting the two-dimensional coordinate data into the coordinate space where the virtual environment is located, which is not particularly limited thereto.

Step S1200, first image data corresponding to the real environment and second image data corresponding to the virtual environment are obtained when the target position information meets a predetermined condition, both the first image data and the second image data being based on the same coordinate space.

In one embodiment, in the case where the method is applied in a virtual reality device and the virtual reality device includes an image collecting apparatus, said obtaining the first image data corresponding to the real environment includes: obtaining fourth image data for the real environment collected by the image collecting apparatus; and converting an object contained in the fourth image data into a coordinate space corresponding to the second image data to obtain the first image data.

The fourth image data may be two-dimensional coordinate data. Of course, in the case where the image collecting apparatus includes depth information, the fourth image data may be three-dimensional stereoscopic data.

Generally, the coordinate spaces where the fourth image data collected by the image collecting apparatus is located are different. Therefore, in order to facilitate the timely generation of the third image data that is mixed with an object in the real environment when the target position information meets the predetermined condition, in an embodiment of the present disclosure, after obtaining the fourth image data, the object contained in the fourth image data may be converted into the coordinate space used by the virtual environment by using the stereoscopic vision imaging principle and the computer vision technology, to obtain the first image data. That is, in an embodiment of the present disclosure, the coordinate system of the three-dimensional coordinate data representing the position information of the various objects in the real environment in the first image data coincides with the coordinate system of the three-dimensional coordinate data representing the position information of various objects in the virtual environment in the second image data.

In one embodiment, said obtaining the first image data corresponding to the real environment and the second image data corresponding to the virtual environment when the target position information meets a predetermined condition includes: obtaining the first image data and the second image data when a first distance between a position represented by the target position information and a predetermined boundary is smaller than a first predetermined threshold.

Specifically, in this embodiment, during the process that a user wears a virtual reality device to experience a virtual environment, the user can freely walk as required. In this process, the virtual reality device can obtain the target position information of the user in the real environment via at least two image collecting apparatuses integrated into the virtual reality device. When the target position information is in a predetermined security area virtual fence, and when a first distance from it to other objects in the real environment, namely various obstacles, is greater than or equal to a first predetermined threshold, the current position of the user can be determined to be relatively safe. The collision problem does not occur, and at this time, a display apparatus of the virtual reality device, for example, a display screen, can only display image data corresponding to the virtual environment, so as to ensure a good user experience. When the first distance between the target position information and the boundary of the security area virtual fence is smaller than the first predetermined threshold, or the first distance between the target position information and other objects in the real environment, for example, a wall, a table or a mobile pet, is smaller than the first predetermined threshold, it can be determined that there is a potential security risk at the current position of the user, and at this time, it can trigger superposing and merging the image data corresponding to the real environment and the image data corresponding to the virtual environment, so as to remind the user in time to ensure the user's security.

In another embodiment, said obtaining the first image data corresponding to the real environment and the second image data corresponding to the virtual environment when the target position information meets the predetermined condition includes: obtaining the first image data and the second image data when a second distance between a position represented by the target position information and a target object in the real environment is smaller than a second predetermined threshold, the target object being predetermined by the user.

Specifically, there may be a need to interact with various objects in the real environment when the user is in the virtual environment, e.g. interact with pets in the real environment without departing from the virtual environment. Therefore, in this embodiment, the target information of the target object that can be displayed in a manner of superposition can be set in advance by the user in the virtual reality device. The target information can be at least one of the category, name identification, image, and the like of the target object.

In a specific implementation, when the target position information corresponding to the user meets the predetermined condition set in any one of the above-mentioned embodiments, the processing of superpositioning and merging image data corresponding to a real environment onto image data corresponding to a virtual environment can be triggered, namely, the processing of generating mixed reality data is triggered.

Step S1300, superposition and merging processing is performed on the first image data and the second image data to generate the third image data.

In one embodiment, said performing superposition and merging processing on the first image data and the second image data to generate the third image data includes: rendering all objects contained in the first image data to corresponding positions in the second image data to obtain the third image data.

Specifically, since the first image data and the second image data are image data based on the same coordinate system, when the target position information corresponding to the user meets the predetermined condition, in order to timely and accurately remind the user without the user departing from the virtual environment, so as to avoid security risks, in an embodiment of the present disclosure, various objects in the real environment contained in the first image data can be correspondingly rendered to the second image data, namely, the corresponding positions of the virtual environment, to obtain the third image data that is obtained by superposing and merging the virtual object and the real object in the virtual world and the real world.

Further, in one embodiment, said rendering all objects contained in the first image data to the corresponding positions in the second image data to obtain the third image data includes: obtaining a first object category and first position information of a first object in the first image data, the first object being any object in the first image data; obtaining a second object category of a second object at a position represented by the first position information in the second image data; determining a relative positional relationship between the first object and the second object based on the first object category and the second object category; and rendering the first object to the second image data based on the relative positional relationship to obtain the third image data.

The first object may be various physical objects in a real environment, such as a wall body, a table, a stool, a pet, etc.

The second object may be various virtual objects in a virtual environment, such as a virtual wall body, a virtual table, a virtual building, etc.

Specifically, in order to improve the user experience, in the process of superposing to generate the third image data, when the positions of the first object in the real environment and the second object in the virtual environment are the same, in order to enhance the user experience, a relative positional relationship between the two objects can be determined based on a first object category of the first object and a second object category of the second object, so that the third image data obtained by superposing and merging is more consistent with reality and appeals better to the visual sense.

For example, even if the position of a table in the real environment is the same as the position of a chair in the virtual environment, the relative positional relationship should be that the chair is beside the table, or that the chair is on the table, rather than that the table is on the chair.

Step S1400, the third image data is displayed to enable the user to view environment data in the real environment when the user is experiencing the virtual environment based on the third image data.

After obtaining the third image data in the above steps, the third image data is displayed on the display apparatus of the virtual reality device, and the user can thus know the distance between the user and various objects in the real environment in advance, so as to perform avoiding in advance and avoid a safety problem.

In one embodiment, after displaying the third image data, the method further includes: obtaining third position information of the user; and stopping generating and displaying the third image data when the third position information does not meet the predetermined condition.

That is, in a specific implementation, after it is determined that the target position information corresponding to the user is close to the boundary of the security area virtual fence or to various objects in the real environment, and the third image data obtained by performing superposition and merging processing is displayed on the display screen so as to remind the user, when the user performs avoiding and the third position information where the user is located does not meet the predetermined condition, that is, there is no potential security risk, in order to provide the user with better visual sense, the virtual display device can automatically stop performing superposition and merging processing on the image data, and continue displaying the second image data.

In summary, with the method in the embodiments of the present disclosure, when a user is in a virtual environment, target position information of the user in a real environment is obtained, and when the target position information meets a predetermined condition, the first image data corresponding to the real environment and the second image data corresponding to the virtual environment are obtained, and the third image data generated after performing superposition and merging processing on the first image data and the second image data is displayed to the user, so that the user can understand and determine the obstacle and the distance to the obstacle in the real environment without departing from the virtual environment based on the third image data, so as to pre-warn the user in advance, thereby avoiding the problem that the reminding is not timely.

Apparatus Embodiments

Figure 2:
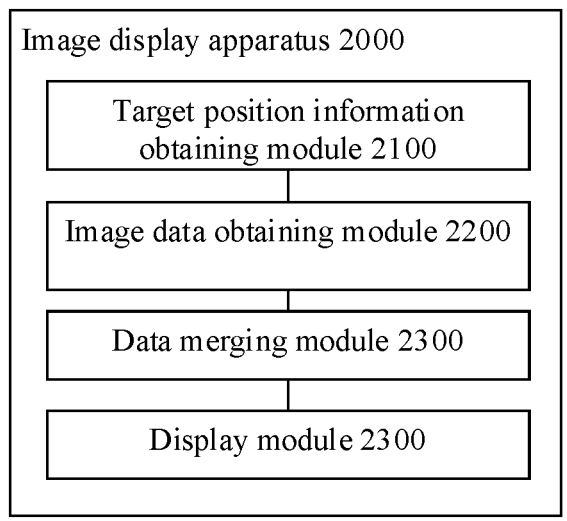
FIG. 2 is a schematic diagram of a principle of an image display apparatus according to an embodiment of the present disclosure.

Corresponding to the above-mentioned method embodiments, FIG. 2 is a schematic diagram of a principle of an image display apparatus according to an embodiment of the present disclosure. As shown in FIG. 2, the image display apparatus may include a target position information obtaining module 2100, an image data obtaining module 2200, a data merging module 2300, and a display module 2400.

The target position information obtaining module 2100 is configured to obtain target position information of a user in a real environment when the user is in a virtual environment.

The image data obtaining module 2200 is configured to obtain first image data corresponding to the real environment in real time and second image data corresponding to the virtual environment in real time when the target position information meets a predetermined condition, both the first image data and the second image data being based on a same coordinate space.

The data merging module 2300 is configured to perform superposition and merging processing on the first image data and the second image data to generate third image data.

The display module 2400 is configured to display the third image data, to enable the user to view environment data in the real environment when the user is experiencing the virtual environment based on the third image data.

In one embodiment, the image data obtaining module 2200 may be specifically configured to obtain the first image data and the second image data when a first distance between a position represented by the target position information and a predetermined boundary is smaller than a first predetermined threshold.

In one embodiment, the image data obtaining module 2200 can be specifically configured to obtain the first image data and the second image data when a second distance between a position represented by the target position information and a target object in the real environment is smaller than a second predetermined threshold, the target object being predetermined by the user.

In one embodiment, the apparatus is applied in a virtual reality device. The virtual reality device comprises an image collecting apparatus. When obtaining the first image data corresponding to the real environment, the image data obtaining module 2200 can be configured to obtain fourth image data for the real environment collected by the image collecting apparatus; and convert an object contained in the fourth image data into the coordinate space corresponding to the second image data to obtain the first image data.

In one embodiment, the data merging module 2300 can be configured to, when performing superposition and merging processing on the first image data and the second image data to generate the third image data: render all objects contained in the first image data to corresponding positions in the second image data to obtain the third image data.

In one embodiment, the data merging module 2300 can be configured to, when rendering all objects contained in the first image data to the corresponding positions in the second image data to obtain the third image data: obtain a first object category and first position information of a first object in the first image data, the first object being any object in the first image data; obtain a second object category of a second object at a position represented by the first position information in the second image data; determine a relative positional relationship between the first object and the second object based on the first object category and the second object category; and render the first object to the second image data based on the relative positional relationship to obtain the third image data.

In one embodiment, after displaying the third image data, the apparatus further includes a restoration display module configured to obtain third position information of the user; and stop generating and displaying the third image data when the third position information does not meet the predetermined condition.

Device Embodiments

Corresponding to the above embodiments, in the present embodiment, provided is an electronic device that may include the image display apparatus 2000 according to any embodiment of the present disclosure, for implementing the image display method according to any embodiment of the present disclosure.

Figure 3:
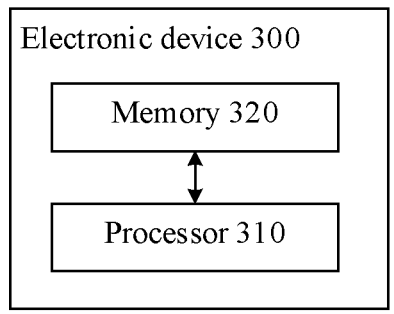
FIG. 3 is a schematic diagram of a hardware structure of an electronic device according to an embodiment of the present disclosure.

As shown in FIG. 3, the electronic device 300 includes a processor 310 and a memory 320. The memory 320 has an executable computer program stored thereon, and the processor 310 is configured to execute the image display method according to any of the above method embodiments under control of the computer program.

The above modules of the image display apparatus 2000 may be implemented by the processor 310 in the present embodiment executing the computer program stored in the memory 320, or may be implemented by other circuit structures, which are not limited thereto.

Computer-Readable Storage Medium Embodiments

The present embodiment provides a computer-readable storage medium that stores executable commands. When the executable commands are executed by a processor, the image display method described in any method embodiment of this description is executed.

One or more embodiments of the present description may be a system, method, and/or computer program product. The computer program product may include a computer-readable storage medium having computer-readable program instructions stored thereon for causing a processor to implement various aspects of the present description.

A computer-readable storage medium may be a tangible device that can hold and store instructions for use by an instruction execution device. The computer-readable storage medium may be, for example, but is not limited to, an electrical storage device, a magnetic storage device, an optical storage device, an electromagnetic storage device, a semiconductor storage device, or any suitable combination of the preceding. More specific examples (a non-exhaustive list) of the computer-readable storage medium include a portable computer disk, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disc (DVD), a memory stick, a floppy disk, a mechanical encoding device such as a punch card or a protrusion-in-groove structure having instructions stored thereon, and any suitable combination of the above. The computer-readable storage medium, as used herein, is not to be construed as an instantaneous signal itself, such as a radio wave or other freely-propagating electromagnetic wave, an electromagnetic wave propagating through a waveguide or other transmission media (e.g. an optical pulse through a fiber optic cable), or an electrical signal transmitted through an electrical wire.

The computer-readable program instructions described herein may be downloaded from a computer-readable storage medium to various computing/processing devices, or to external computers or external storage devices over a network, such as the Internet, a local area network, a wide area network, and/or a wireless network. The network may include copper transmission cables, fiber optic transmissions, wireless transmissions, routers, firewalls, switches, gateway computers, and/or edge servers. A network adapter card or network interface in each computing/processing device receives computer-readable program instructions from the network and forwards the computer-readable program instructions for storage in a computer-readable storage medium in the respective computing/processing device.

Computer program instructions for carrying out operations of the embodiments of the present description may be assembly instructions, instruction set architecture (ISA) instructions, machine instructions, machine-related instructions, microcode, firmware instructions, state setting data, or source code or object code written in any combination of one or more programming languages, including object-oriented programming languages, such as Smalltalk, C++ and the like, and conventional procedural programming languages, such as the "C" language or similar programming languages. Computer readable program instructions can be completely executed on the user's computer, partially executed on the user's computer, executed as one standalone software package, partially executed on the user's computer and partially executed on a remote computer, or completely executed on a remote computer or a server. In the case of relating to a remote computer, the remote computer may be connected to the user's computer through any kind of network, including a local area network (LAN) or a wide area network (WAN), or may be connected to an external computer (e.g. through an Internet connection by using an Internet service provider). In some embodiments, various aspects of the present description are implemented by individualizing a customized electronic circuit, such as a programmable logic circuit, a field programmable gate array (FPGA), or a programmable logic array (PLA) by using the state information of computer-readable program instructions. The electronic circuit can execute computer-readable program instructions.

Various aspects of this description are described here with reference to the flowchart and/or block diagram of the method, apparatus (system), and computer program product according to the embodiments of this description. It should be understood that each block in the flowchart and/or block diagram, as well as a combination of each block in the flowchart and/or block diagram, can be implemented by computer-readable program instructions.

The computer-readable program instructions can be provided to processors of general-purpose computers, special-purpose computers, or other programmable data processing apparatuses to produce a machine. Therefore, when these instructions are executed by a processor of a computer or other programmable data processing apparatuses, an apparatus is generated to implement the function/action specified in one or more blocks in the flowchart and/or block diagram. The computer-readable program instructions may also be stored on a computer-readable storage medium. The instructions may cause a computer, a programmable data processing apparatus, and/or other devices to work in a particular manner, such that a computer-readable medium having instructions stored thereon includes one manufactured product that includes instructions implementing various aspects of the function/action specified in one or more blocks in the flowchart and/or block diagram.

The computer-readable program instructions can also be loaded onto a computer, other programmable data processing apparatuses, or other devices to perform a series of operational steps on the computer, other programmable data processing apparatus, or other devices, in order to generate a computer-implementing process, thereby enabling instructions executed on computers, other programmable data processing apparatuses, or other devices to implement the function/action specified in one or more blocks in the flowchart and/or block diagram.

The flowcharts and block diagrams in the accompanying drawings show the possible implementation of system structure, functions, and operations of the system, method, and computer program product according to a plurality of embodiments of the present description. In this regard, each block in the flowcharts or block diagrams may represent one module, a program segment, or a part of the instruction, which includes one or more executable instructions for implementing the specified logical function. In some alternative implementations, the functions noted in the blocks may also occur in a different order than the order noted in the drawings. For example, two successive blocks may in fact be executed substantially in parallel, or they may sometimes be executed in the reverse order, depending on the functionality involved. It also needs to be noted that each block in the block diagrams and/or flowcharts, and the combination of the blocks in the block diagrams and/or flowcharts, can be implemented by a dedicated hardware-based system that executes the specified function or action, or can be implemented by a combination of dedicated hardware and computer instructions. It is well known to those skilled in the art that hardware implementations, software implementations, and combinations of software and hardware are equivalent.

The above has described various embodiments of this description, which are exemplary, not exhaustive, and are not limited to the disclosed embodiments. Many modifications and variations will be apparent to those of ordinary skill in the art without departing from the scope and spirit of the embodiments described. The selection of terms used herein aims to best explain the principles, practical applications, or technological improvements in the market of each embodiment, or to enable other ordinary skilled in the art to understand the disclosed embodiments. The scope of the present application is limited by the attached claims.

What is claimed is:

1. An image display method, comprising:
    obtaining target position information of a user in a real environment when the user is in a virtual environment;
    obtaining first image data corresponding to the real environment and second image data corresponding to the virtual environment when the target position information meets a predetermined condition, both the first image data and the second image data being based on a same coordinate space;
    performing superposition and merging processing on the first image data and the second image data to generate third image data; and
    displaying the third image data, to enable the user to view environment data in the real environment when the user is in the virtual environment,
    wherein said performing superposition and merging processing on the first image data and the second image data to generate the third image data comprises:
    obtaining a first object category and first position information of a first object in the first image data, the first object being any object in the first image data;
    obtaining a second object category of a second object at a position represented by the first position information in the second image data;
    determining a relative positional relationship between the first object and the second object based on the first object category and the second object category; and
    rendering the first object to the second image data based on the relative positional relationship to obtain the third image data.

2. The method according to claim 1, wherein said obtaining the first image data corresponding to the real environment and the second image data corresponding to the virtual environment when the target position information meets the predetermined condition comprises:
    obtaining the first image data and the second image data when a first distance between a position represented by the target position information and a predetermined boundary is smaller than a first predetermined threshold.

3. The method according to claim 1, wherein said obtaining the first image data corresponding to the real environment and the second image data corresponding to the virtual environment when the target position information meets the predetermined condition comprises:
    obtaining the first image data and the second image data when a second distance between a position represented by the target position information and a target object in the real environment is smaller than a second predetermined threshold, the target object being predetermined by the user.

4. The method according to claim 1, wherein the method is applied in a virtual reality device comprising an image collecting apparatus; and
    wherein said obtaining the first image data corresponding to the real environment comprises:
    obtaining fourth image data for the real environment collected by the image collecting apparatus; and
    converting an object contained in the fourth image data into the coordinate space corresponding to the second image data to obtain the first image data.

5. The method according to claim 1, further comprising, subsequent to said displaying the third image data:
    obtaining third position information of the user; and
    stopping generating and displaying the third image data when the third position information does not meet the predetermined condition.

6. The method according to claim 1, wherein the method is applied in at least one of: a virtual reality device, an augmented reality device, or a mixed reality device.

7. An image display apparatus, comprising:
    a target position information obtaining module configured to obtain target position information of a user in a real environment when the user is in a virtual environment;
    an image data obtaining module configured to obtain first image data corresponding to the real environment in real-time and second image data corresponding to the virtual environment in real-time when the target position information meets a predetermined condition, both the first image data and the second image data being based on a same coordinate space;

a data merging module configured to perform superposition and merging processing on the first image data and the second image data to generate third image data; and a display module configured to display the third image data, to enable the user to view environment data in the real environment when the user is experiencing the virtual environment based on the third image data, wherein the data merging module is further configured to:

obtain a first object category and first position information of a first object in the first image data, the first object being any object in the first image data;

obtain a second object category of a second object at a position represented by the first position information in the second image data;

determine a relative positional relationship between the first object and the second object based on the first object category and the second object category; and render the first object to the second image data based on the relative positional relationship to obtain the third image data.

8. An electronic device, comprising the apparatus according to claim 7.

9. An electronic device, comprising:

a memory having executable instructions stored thereon; and a processor configured to, under control of the instructions, cause the electronic device to obtain target position information of a user in a real environment when the user is in a virtual environment;

obtain first image data corresponding to the real environment and second image data corresponding to the virtual environment when the target position information meets a predetermined condition, both the first image data and the second image data being based on a same coordinate space;

perform superposition and merging processing on the first image data and the second image data to generate third image data; and display the third image data, to enable the user to view environment data in the real environment when the user is in the virtual environment, wherein said performing superposition and merging processing on the first image data and the second image data to generate the third image data comprises:

obtaining a first object category and first position information of a first object in the first image data, the first object being any object in the first image data;

obtaining a second object category of a second object at a position represented by the first position information in the second image data;

determining a relative positional relationship between the first object and the second object based on the first object category and the second object category; and rendering the first object to the second image data based on the relative positional relationship to obtain the third image data.

10. The electronic device according to claim 9, wherein said obtaining the first image data corresponding to the real environment and the second image data corresponding to the virtual environment when the target position information meets the predetermined condition comprises:

obtaining the first image data and the second image data when a first distance between a position represented by the target position information and a predetermined boundary is smaller than a first predetermined threshold.

11. The electronic device according to claim 9, wherein said obtaining the first image data corresponding to the real environment and the second image data corresponding to the virtual environment when the target position information meets the predetermined condition comprises:

obtaining the first image data and the second image data when a second distance between a position represented by the target position information and a target object in the real environment is smaller than a second predetermined threshold, the target object being predetermined by the user.

12. The electronic device according to claim 9, wherein the electronic device comprises an image collecting apparatus; and wherein said obtaining the first image data corresponding to the real environment comprises:

obtaining fourth image data for the real environment collected by the image collecting apparatus; and converting an object contained in the fourth image data into the coordinate space corresponding to the second image data to obtain the first image data.

13. The electronic device according to claim 9, wherein the processor is further configured to, under control of the instructions, cause the electronic device to, subsequent to said displaying the third image data:

obtain third position information of the user; and stop generating and displaying the third image data when the third position information does not meet the predetermined condition.

14. The electronic device according to claim 9, wherein the electronic device is at least one of: a virtual reality device, an augmented reality device, or a mixed reality device.

* * * * *